S. L. GOULD

Improvement in Paper-Pulp Engines.

No. 4,976. Reissued July 16, 1872.

Witnesses.
C. B. Nottingham
M. Gardner.

Inventor.
Simeon L. Gould
by atty A. Hodik

UNITED STATES PATENT OFFICE.

SIMEON L. GOULD, OF SKOWHEGAN, MAINE.

IMPROVEMENT IN PAPER-PULP ENGINES.

Specification forming part of Letters Patent No. 120,265, dated October 24, 1871; reissue No. 4,976, dated July 16, 1872.

*To whom it may concern:*

Be it known that I, SIMEON L. GOULD, of Skowhegan, Somerset county, Maine, have invented certain new and useful Improvements in Paper-Pulp Engines, of which the following is a specification:

This invention relates to machinery for making paper-pulp. It principally consists in a mode of maintaining the circulation of the stock within the case or tub or curb, and between the grinding-surfaces, by centrifugal action induced by a rotary grinding-disk, through the center of which, or thereabout, the stock passes to and between the grinding-surface. It further consists in an improvement in the construction of the case, whereby the stock, when thrown outward from between the grinding-surfaces by the centrifugal action of the rotary grinding-disk, will be effectually caused to return and be delivered into the central opening or openings in said disk, whence it will again be circulated between the grinding-surfaces by the centrifugal action.

The accompanying drawing represents so much of a pulping-engine as is needed to illustrate my improvements.

Figure 1:
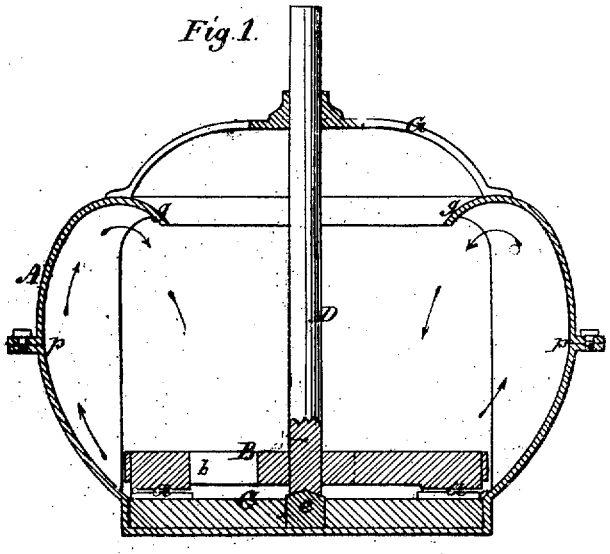
Figure 2:
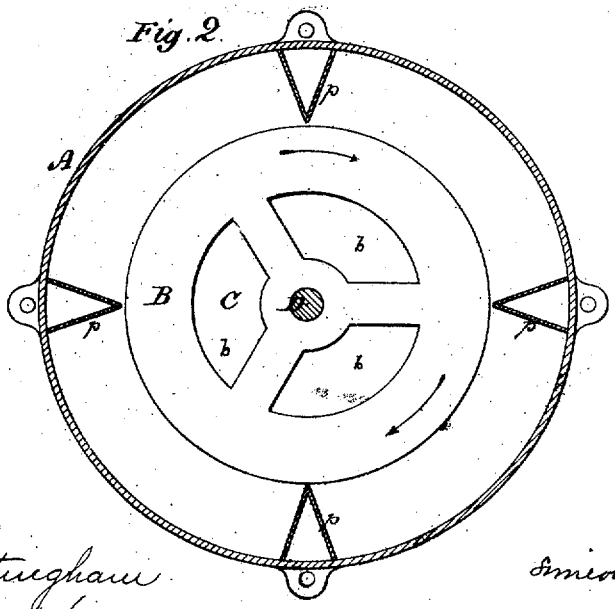

Figure 1 is a vertical central section through the machine. Fig. 2 is a horizontal section through the same.

Within a case, tub, or curb, A, provided at or near its bottom with a suitable horizontal grinding-bed, C, armed with blades *a*, is a disk or wheel, B, fixed to a vertical shaft, D, supported on a step, *e*, and having its upper bearing in an arch, G, fast to the top of the curb or case. The under surface of the disk, or that surface contiguous to the grinding bed C, is armed with blades *a* thickly set, and arranged so as to operate with a shear-cut on the blades of bed C, for reducing, disintegrating, and separating the fibers of straw, wood, rags, and other substances for making paper-pulp, the object being to obtain two disintegrating or grinding surfaces, between which the substance to be pulped must pass.

The drawing does not show means for rotating the shaft D or for adjusting this shaft up and down, as such means are well known to those skilled in the art to which these improvements pertain, and need not, therefore, be here particularized.

In the rotary disk B, at or near its center, I form one or more openings, *b*, through which the stock will pass down to the bed C, where it will be carried through between the grinding surfaces, and finally thrown out from them by the centrifugal action induced by the rotary grinding-disk. I thus provide for circulation of the stock within the curb or case and between the grinding-surfaces, the stock, after passing from the center to the circumference of the disk between the grinding-surfaces, being then thrown off and gradually carried back over the top of the disk until it falls again through the opening or openings *b*, to be again carried between the grinding surfaces and discharge at the circumference from under the disk. In order to better direct the stock back to the center of the disk B, after it has been thrown off from between the grinding surfaces by centrifugal action, I, in some instances, prefer to shape the case or curb A as shown in the drawing. It will be seen that its sides are bulging, and they terminate above in a curved overhanging contracted portion, *g*, the form of which is such as to turn and direct downward toward the center of the case the substances which rise in contact with its bulging sides. The general shape of the case below the concave contracted portion *g* is preferably that of a hyperboloid, which I believe to be the best adapted for directing upwardly the substances which are thrown against its interior surface by the centrifugal action of the disintegrating-disk B. I do not, however, confine myself to the hyperboloidal shape, as other forms approaching thereto may be adopted. At suitable intervals, inside of the case A, I arrange vertically four, or more or less, partitions, *p*, which will resist the tendency of the substances to be carried around with the wheel B after they are thrown off therefrom.

Having described my invention, what I claim, and desire to secure by Letters Patent, is—

1. The mode herein described of keeping the stock in circulation within the curb or case, and between the grinding surfaces, by centrifugal action induced by a rotary grinder, through the center of which or thereabout the stock is caused to pass to and outwardly between the grinding-surfaces, substantially as herein set forth.

2. The combination, in paper-pulping machinery, of the following elements, viz: a curb or case, a horizontal grinding-bed, and a superposed revolving grinding-disk, through the center of which or thereabout the stock passes to and between the contiguous grinding-surfaces of said bed and disk, the combination operating substantially as herein shown and described.

3. The case A *g*, in combination with the centrifugal disintegrator B, substantially as described.

4. The partitions *p* arranged in the case A *g*, in combination with a centrifugal disintegrator, substantially as described.

5. The employment, in paper-pulp engines, substantially such as described, of a revolving grinder, rotating upon a vertical axis, receiving the stock at or near its center, and delivering or discharging the same at its circumference, substantially in the manner set forth.

SIMEON L. GOULD.

Witnesses:
WM. H. F. TOWER,
A. C. STILPHEN.